United States Patent [19]
van der Lely

[11] 4,111,263
[45] Sep. 5, 1978

[54] SOIL TILLING MACHINES

[76] Inventor: Cornelis van der Lely, 7, Brüschenrain, Zug, Switzerland

[21] Appl. No.: 730,282

[22] Filed: Oct. 6, 1976

[30] Foreign Application Priority Data

Oct. 8, 1975 [NL] Netherlands .............. 7511788

[51] Int. Cl.² .............................................. A01B 27/00
[52] U.S. Cl. ........................................ 172/54; 172/97; 172/63
[58] Field of Search ............... 172/48, 97, 50, 53, 172/54, 63, 101, 89, 87, 84, 40

[56] References Cited

U.S. PATENT DOCUMENTS

| | | | |
|---|---|---|---|
| 1,368,177 | 2/1921 | Magistro | 172/89 |
| 1,400,673 | 12/1921 | Gilliland | 172/89 |
| 1,458,655 | 6/1923 | Jahn | 172/118 X |
| 1,869,961 | 8/1932 | Glasier | 172/54 |
| 2,641,982 | 6/1953 | Harshberger | 172/40 |
| 3,296,985 | 1/1967 | Shelton | 172/40 |

FOREIGN PATENT DOCUMENTS 420,886 11/1925 Fed. Rep. of Germany ............. 172/48
239,465 10/1911 Fed. Rep. of Germany ............. 172/48

*Primary Examiner*—Richard J. Johnson
*Attorney, Agent, or Firm*—Mason, Mason & Albright

[57] ABSTRACT

A tilling machine has a frame with a row of tines or rotatable tined soil working members in a row that extends transverse to the direction of travel. A drive is connected to rock the tines or rotate the tined members during operation. The same drive has an eccentric that links an elongated tilling member to the machine at the rear of the tines. The tilling member is pivoted to the frame and movable through a closed but non circular path by the eccentric and elongate elements of the tilling member are moved through a renoform path to both work and level ground previously worked by the tines. Adjustments to change the working levels of the tines and/or the tilling member can be made by rearranging the linkage connections to the frame.

13 Claims, 6 Drawing Figures

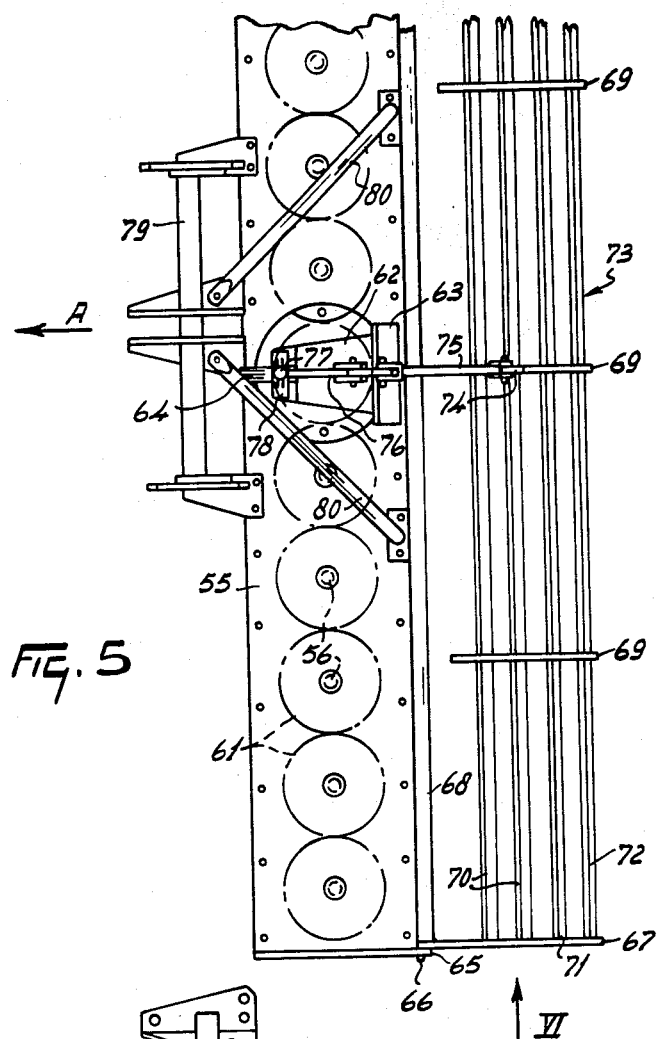
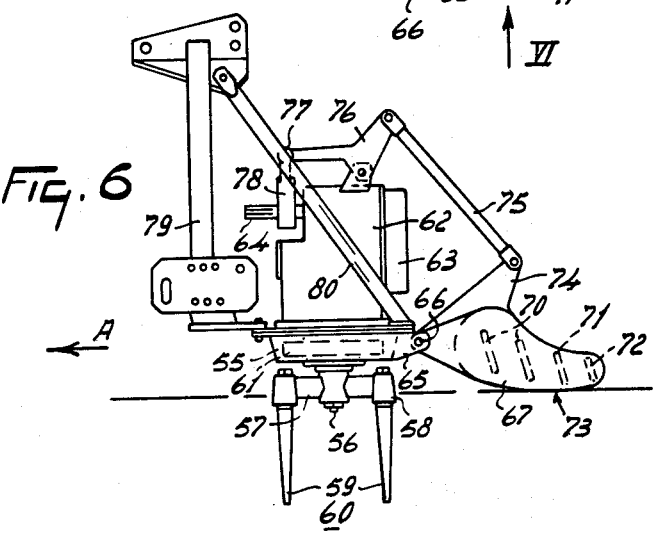

SOIL TILLING MACHINES

This invention relates to soil tilling machines of the kind having power driven soil tilling members.

According to one aspect of the invention, there is provided a soil tilling machine of the kind set forth, wherein a soil working member comprises at least one elongate element that works the soil during an upwardly directed reciprocating movement.

Figure 1:
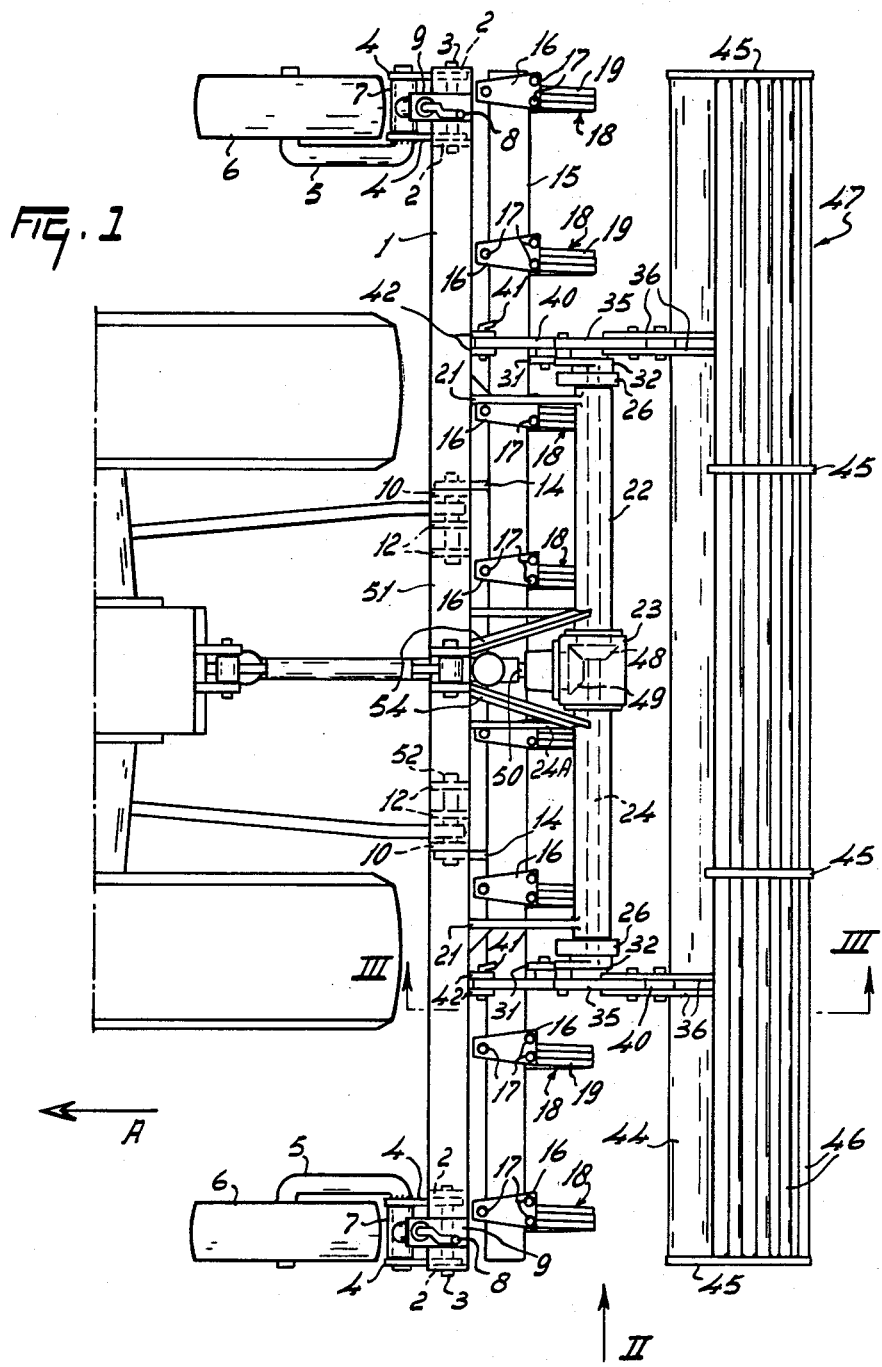
Figure 2:
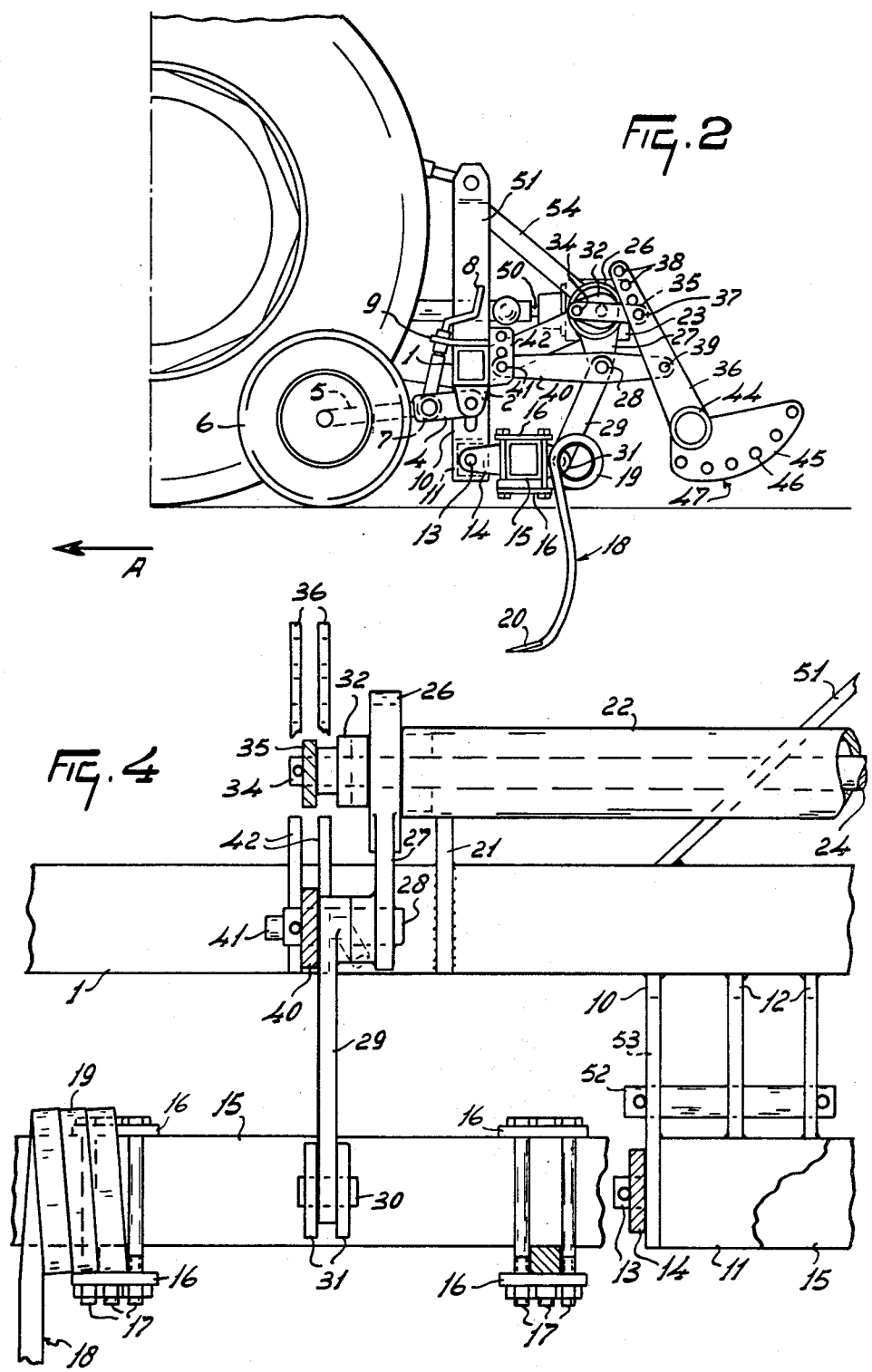
Figure 3:
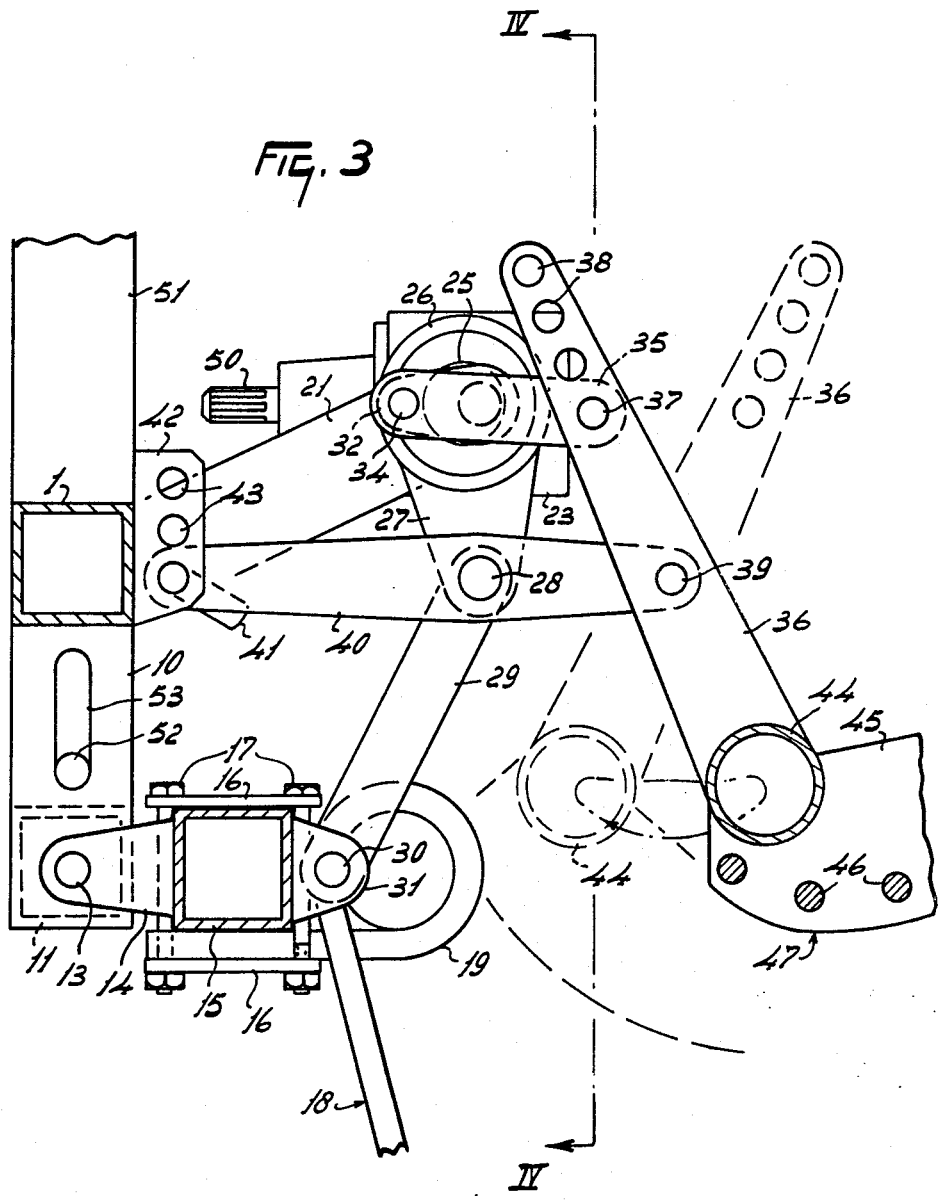

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a section, to an enlarged scale, taken on the III—III in FIG. 1, FIG. 4 is a section taken on the line IV—IV in FIG. 3, FIG. 5 is a plan view of an alternative form of a soil cultivating implement in accordance with the invention, and FIG. 6 is a side elevation as seen in the direction indicated by an arrow VI in FIG. 5.

Referring to FIGS. 1 to 4 of the accompanying drawings, the soil cultivating or tilling machine that is illustrated therein has a frame which comprises a main frame beam 1 that extends substantially horizontally and usually perpendicular or substantially perpendicular to the intended direction of operative travel of the implement that is indicated by an arrow A in FIGS. 1 and 2 of the drawings. The main frame beam 1 is of a hollow formation and has a polygonal cross-section that it is preferred should be the square cross-section that is illustrated. Whether or not the preferred square cross-section is employed, at least one side of the polygonal cross-section main frame beam 1 is horizontally or substantially horizontally disposed. Pairs of lugs 2 project downwardly from the lower surface of the main frame beam 1 at locations close to the opposite ends of that beam, the two lugs 2 in each pair being spaced apart from one another by a short distance lengthwise along the beam 1. Each pair of lugs 2 carries a corresponding substantially horizontal shaft 3 that is parallel to the main frame beam 1 and thus substantially perpendicular to the direction A, the two shafts 3 being axially aligned. Each shaft 3 has the rear ends of a corresponding pair of strips 4 turnably mounted upon it between the corresponding pair of lugs 2, said strips 4 extending forwardly with respect to the direction A from the associated shaft 3 and being inclined obliquely downwardly from that shaft towards the ground surface. The two strips 4 of each pair are in parallel relationship with one another. The leading lower end of at least one of the two strips 4 of each pair is welded or otherwise rigidly secured to a substantially horizontal portion of a rod-shaped arm 5, said arm 5 also comprising an axle portion that is parallel to the substantially horizontal portion that has just been mentioned and an integrally interconnecting portion that extends parallel to the strips 4 as seen in side elevation (FIG. 2). The two axle portions of the two rod-shaped arms 5 have corresponding ground wheels 6 rotatably mounted upon them, said axle portions usually being arranged in substantially horizontal alignment with one another. The substantially horizontal portion of each rod-shaped arm 5 that does not function as an axle is surrounded, between the lower leading ends of the corresponding strips 4, by a substantially horizontal sleeve 7 and each sleeve 7 has one end of one portion of a corresponding adjuster perpendicularly secured to it. Each adjuster also comprises a second axially registering portion that is secured to a bracket 9 fastened to the top of the main frame beam 1 at a location which is between the lugs 2 of the corresponding pair as seen in plan view (FIG. 1). The adjusters are increased, as reduced, in length, as may be required, by manually rotating corresponding crank handles 8 at the upper ends of screwthreaded spindles. It is not necessary to describe the adjusters that include the crank handles 8 and the bracket 9 in detail since their construction and operation is already well known per se.

Strip-shaped supports 10 project downwardly from the lower surface of the main frame beam 1 at equal distances from the midpoint of that frame beam, said supports 10 being substantially vertically disposed in substantially parallel relationship with one another. A frame beam 11 that is of the same formation and cross-section as the main frame beam 1 rigidly interconnects the lowermost ends of the two supports 10, extending parallel to the main frame beam 1 at a location spaced vertically therebeneath. Four strips 12 substantially vertically interconnect the main frame beam 1 and the underlying frame beam 11 at locations whose positions can be seen in FIG. 1 of the drawings, there effectively being two pairs of the strips 12 with each pair spaced inwardly towards the midpoints of the two beams 1 and 11 from the corresponding supports 10 and with the two strips 12 in each pair being spaced by a short distance from one another. However, the spacing between the two strips 12 of each pair is a little less than the spacing between the outer strip 12 of that pair and the corresponding support 10 (see FIG. 4). The relatively remote surfaces of the two strip-spaced supports 10 perpendicularly carry substantially horizontally disposed stub shafts 13 that are in axial alignment with one another and the leading ends of the two lugs 14 are turnably mounted upon corresponding ones of the two stub shafts 13, the two lugs 14 being rigidly secured to the front of a support beam 15 that extends substantially horizontally perpendicular to the direction A in parallel or substantially parallel relationship with the main frame beam 1 and with the beam 11. The support beam 15 is of the same length as the main frame beam 1 and its opposite ends are in substantial register, in the direction A, with the opposite ends of said main frame beam 1, the support beam 15 being located immediately to the rear of both the main frame beam 1 and the beam 11 as seen in plan view (FIG. 1). The support beam 15 has the same formation and cross-section as do both the main frame beam 1 and the beam 11, a plurality (in this case eight) of spring steel cultivator tines 18 having fastening portions thereof firmly clamped against the lower surface of the beam 15 at regular intervals along its transverse length. The clamping is effected by pairs of upper and lower substantially trapezoidal clamping plates 16 and by substantially vertically disposed bolts 17 arranged in groups of three.

The spring steel material from which each cultivator tine 18 is formed is preferably, as illustrated, of square cross-section (see FIG. 4) although other polygonal cross-sections may also be employed. The fastening portion of each cultivator tine 18 is clamped between the lower surface of the support beam 15 and the upper surface of the corresponding lower clamping plate 16 in such a position that it extends substantially, although not necessarily exactly, parallel to the direction A, its rearmost end merging integrally into a helical coil 19 which comprises nearly three complete 360° turns. At the end of each coil 19 that is remote from the fastening portion of the tine 18 concerned, said coil merges integrally into a downwardly directed soil working portion of the tine that is initially orientated rearwardly at a few degrees to the vertical but which subsequently, at a lower level, is curved gently downwards and forwards with respect to the direction A to terminate in an obliquely forwardly and downwardly inclined free end. Each free end is preferably provided, as illustrated in FIG. 2, with a chisel blade 20 that may conveniently be secured to the free end concerned in a replaceable manner by, for example, countersunk machine screws. This construction and arrangement is not, however, illustrated in detail in the drawings since it is not relevant to the present invention. Two strip-shaped supports 21 extend obliquely upwardly and rearwardly with respect to the direction A from the rear surface of the main frame beam 1 at two locations which are spaced further from the midpoint of that beam than are the two supports 10. The rearmost and uppermost ends of the two strip-shaped supports 21 are perpendicularly interconnected by a tubular beam 22 that is of circular cross-section, said tubular beam 22 being in parallel or substantially parallel relationship with the main frame beam 1 and being of such a length that its opposite ends are a little further apart than are the two strip-shaped supports 21. A central region of the tubular beam 22 comprises a gear box 23, the tubular beam 22 being directly connected to the rear of the main frame beam 1 by two further strip-shaped supports 24A at locations which are very close to the opposite lateral sides of the gear box 23, said strip-shaped supports 24A being contained in substantially vertical planes that are substantially parallel to the direction A but being, like the supports 21, inclined downwardly and forwardly from the tubular beam 22 to the main frame beam 1. A shaft 24 that is rotatably supported by bearings which are not illustrated in the drawings extends substantially axially throughout the length of the tubular beam 22 and projects beyond the opposite ends of that tubular beam. The two projecting ends have corresponding eccentrics 25 fastened to them and the outer surface of each disc-shaped eccentric 25 is rotatably surrounded by a corresponding ring 26 (FIGS. 3 and 4). A lug 27 projects downwardly from the outer surface of each ring 26 and carries, at its lower end, a horizontal stub shaft 28 that is in parallel relationship with the shaft 24. Each stub shaft 28 has the upper end of a corresponding arm 29 pivotally mounted on it, said arms 29 being inclined downwardly and forwardly from the stub shafts 28 towards the support beam 15. The lower leading ends of the arms 29 are, in fact, pivotally connected to the support beam 15 by corresponding horizontal pivot pins 30 which interconnect pairs of lugs 31 that project rearwardly with respect to the direction A from the back of the support beam 15 (see particularly FIG. 4).

The shaft 24 is provided, immediately beyond the two eccentrics 25, with two crank arms 32, the free ends of the crank arms 32 being pivotally connected by horizontal pins 34 (FIGS. 3 and 4) to the ends of corresponding strip-shaped arms 35. The arms 35 extend generally rearwardly from the ends 34 with respect to the direction A, the rearmost ends of said arms 35 being coupled by horizontal pins 37 to corresponding pairs of downwardly extending supporting arms 36. It will be apparent from FIG. 4 of the drawings that the rearmost end of each arm 35 is pivotally sandwiched between the corresponding pair of arms 36 and from FIGS. 2 and 3 of the drawings that the upper ends of the supporting arms 36 are formed with a plurality (in this case four) of holes 38, any chosen horizontally aligned pair of holes 38 being capable of receiving the corresponding pin 37 to effect the required pivotal connection to the rear end of the corresponding arm 35. The drawings show the pin 37 co-operating with the lowermost holes 38 in each pair of downwardly extending supporting arms 36. Each arm 36 slowly increases in width from its uppermost to its lowermost end and, at locations just below the midpoints of the two arms 36 of each pair, those arms are each connected by horizontal pivot pins 39. The rearmost ends of control arms 40 are pivotally mounted on the pins 39 between the two supporting arms 36 of each pair, said control arms 40 extending generally forwardly with respect to the direction A from the supporting arms 36.

Each control arm 40 is of increasing width considered in a forward direction therealong from the corresponding pivot pin 39 to a location just short of its midpoint. At this location at which each arm 40 is of maximum width, said arm is pivotally mounted on the corresponding substantially horizontal stub shaft 28 and is thus pivotally connected to the lowermost end of the corresponding downwardly directed lug 27. Each control arm 40 is of gradually decreasing width considered forwardly from its location of maximum width and, at its leading end, it is pivotally mounted by a corresponding releasable pin 41 between a pair of vertical lugs 42 that are carried at the rear of the main frame beam 1. As is most clearly visible in FIG. 3 of the drawings, each pair of lugs 42 is formed with a substantially vertically extending row of horizontally aligned pairs of holes 43, each lug 42 being formed with three of the holes 43 in the embodiment that is being described. Each pin 41 can be arranged to connect the leading end of the corresponding control arm 40 pivotally to the respective pair of lugs 42 at any chosen one of three different levels depending upon the pair of holes 43 that is employed. The accompanying drawings show the pins 41 entered through the lowermost pairs of holes 43 in the lugs 42.

The lowermost ends of the two pairs of supporting arms 36 are fastened to the top of a tubular support beam 44 that is of circular cross-section. The tubular support beam 44 extends substantially horizontally parallel to the main frame beam 1 and to the support beam 15 and is of substantially the same length as those two beams, its opposite ends being in substantial register in the direction A, as seen in plan view (FIG. 1), with the opposite ends of said beams 1 and 15. The beam 44 carries, at regular intervals along its length, a plurality of generally rearwardly directed support plates 45 of which there are four in the embodiment that is being described, two of said support plates 45 being located at the extreme opposite ends of the beam 44 and all of said support plates 45 being in substantially parallel relationship with one another and with the direction A. FIG. 2 of the drawings shows the shape of each support plate 45 most clearly and it will be evident from that Figure that each plate is located principally beneath the support beam 44 and has a very approximately crescent-shaped configuration exhibiting a curved lower edge that is of regular arcuate form throughout most, but not all, of its length. The opposite ends of the curved lower edge of each plate 45 join the ends of leading and upper edges of that plate, said leading and upper edges both being substantially straight. A plurality (in this case six) of elongate elements 46 extend between the support plates 45 in substantially parallel relationship with the tubular beam 44 at substantially regularly spaced apart locations which are close to the curved lower edges of the plates 45. Each element 46 is preferably, as illustrated, of solid rod-like formation and circular cross-section but a tubular formation and/or other cross-sections can be used. The lower edges of the four support plates 45 and the immediately neighbouring skeletal surface that is afforded by the six elongate elements 46 are of curved configuration, the radius of curvature being at a minimum close to the leading ends of said edges and of said surface with respect to the direction A. The elongate elements 46 and their support plates 45 together constitute an elongate soil tilling or working member that is generally indicated by the reference 47, said member 47 extending substantially horizontally perpendicular to the direction A.

The shaft 24 that extends through the gear box 23 carries, inside that gear box, a bevel pinion 48 whose teeth are in driven mesh with those of a second bevel pinion 49 mounted at the rearmost end of a rotary input shaft 50 of the gear box, said shaft 50 being in substantially horizontally parallel relationship with the direction A. The rotary input shaft 50 projects forwardly from the front of the gear box 23 and is there splined or otherwise keyed to enable it to be placed in driven connection with the power take-off shaft of an agricultural tractor (FIGS. 1 and 2) or other operating vehicle by way of an intermediate telescopic transmission shaft that is of a construction which is known per se having universal joints at its opposite ends. The top of the main frame beam 1 is provided at its center with a coupling member or trestle 51 that is of a generally triangular configuration when seen in front of rear elevation. The apex of the coupling member or trestle 51 can be pivotally connected, as illustrated, to the rearmost end of the upper adjustable length lifting link of the three-point lifting device or hitch of the agricultural tractor or other vehicle which operates the implement while the free ends of the two lower lifting links of said lifting device or hitch are pivotally connected to horizontal shafts 52 which are upwardly and downwardly movable in vertical slots 53 formed in the supports 10 and strips 12 between the main frame beam 1 and the underlying frame beam 11. Depending upon the distance between the free ends of the lowermost lifting links of the three-point lifting device or hitch of the tractor or other vehicle that is employed, said free ends can be mounted on the shafts 52 either between the corresponding support 10 and one of the corresponding pair of strips 12 or between those two strips 12. Two tie beams 54 that are of strip-shaped formation interconnect substantially the apex of the coupling member or trestle 51 and locations on the tubular beam 22 at opposite sides of the gear box 23, said locations substantially corresponding, at least as seen in plan view, with the connections of the two strip-shaped supports 24A to the tubular beam 22. The tie beams 54 diverge downwardly and rearwardly from their uppermost ends that are connected to the coupling member or trestle 51 to their lowermost and rearmost ends that are secured to the tubular beam 22.

In the use of the soil cultivating implement that has been described with reference to FIGS. 1 to 4 of the accompanying drawings, its coupling member or trestle 51 and the shafts 52 are employed to connect the frame of the implement to the three-point lifting device or hitch of the agricultural tractor or other vehicle that is used to propel and operate the implement. The rotary input shaft 50 of the gear box 23 is placed in driven connection with the power take-off shaft of the same tractor or other operating vehicle by using the known intermediate telescopic transmission shaft that has been referred to above and that can be seen in FIGS. 1 and 2 of the drawings. The depth in the soil down to which cultivation is to take place will depend upon the nature and condition of that soil and the purpose for which it is intended after cultivation. The level of the axes of rotation of the ground wheels 6 relative to that of the frame of the implement is the principal factor which dictates the depth to which the resilient cultivator tines 18 penetrate downwardly into the soil surface and it will be apparent that this level can be adjusted, as may be required, by rotating the crank handles 8 in the required directions to the displace the ground wheels 6 bodily upwardly or downwardly about the axis defined by the shafts 3 relative to the frame of the implement. The elongate soil working member is connected to the remainder of the machine by connecting means that comprises at least four hinges afforded by the pins 34, 37, 39 and 41. Hereby the distance between the pins 34 and 41 at the side of the remainder of the machine differs from the distance between the pins 37 and 39 at the side of the tilling member 47. As the implement moves in the direction A over the land that is to be cultivated, the rotary drive that is imparted to the input shaft 50 of the gear box 23 causes the elongate soil working member 47 that is located rearwardly of the tines 18 to perform a compound rocking motion which is such that the tubular support beam 44 moves repeatedly through the reniform path that is indicated in broken lines in FIG. 3 of the drawings and in the direction that is indicated by an arrow in the same Figure. The driving means which causes this movement to take place includes the crank arms 32 and their pins 34, the latter being eccentrically disposed with respect to the axis of rotation of the shaft 24. As the tubular support beam 44 and the elongate soil working member 47 that is rigid therewith move togetherthrough the reniform path that has just been discussed the lower surface of said member 47 will make repeated contacts with the ground during negotiation of the lower part of said path (see FIG. 3). During such contacts with the ground surface, the elongate elements 46 of the member 47 are being drawn forwardly over the ground surface in the direction A, the shape of the reniform path being such that the leading elements 46 are the first to engage the soil during each such contact while the rearmost elements 46 are the last to engage the soil before contact is lost.

In addition to the motion of the elongate soil working member 47 through the reniform path that has been discussed above, said member 47 is simultaneously caused to rock upwardly and downwardly because of the connection of its supporting arms 36 to the rotating eccentrics 25 by way of the pivot pins 39, the control arms 40, the stub shafts 28, the lugs 27 and the rings 26. This upward and downward rocking motion is also transmitted by the arms 29 to the support beam 15 and thus to the cultivator tines 18 which it carries, said beam 15 and tines 18 rocking upwardly and downwardly, with substantially the same amplitude, about the axis that is defined by the stub shafts 13, said axis extending substantially horizontally perpendicular to the direction A and being located forwardly of the parts 15 and 18 with respect to that direction. The upward and downward rocking movement of the elongate soil working member 47 takes place about the axis that is defined by the removable pivot pins 41, said axis being substantially horizontally perpendicular to the direction A and being located in advance of the member 47 with respect to that direction. The upward and downward rocking movement of the elongate soil working member materially improves the crumling and levelling effect which that member has upon the uppermost layer of soil that is located above the layer thereof which is principally worked by the cultivator tines 18. The rocking motion of the support 15 and the resilient cultivator tines 18 which it carries considerably enhances the loosening effect of the tines 18 upon the soil. By employing the implement that has been described, the soil can be worked very intensively and to a relatively great depth by the upwardly and downwardly rocking resilient cultivator tines 18, the uppermost layer of the soil also being worked by the immediately following elongate member 47 which member and its elements 46 extends substantially horizontally perpendicular to the direction A behind the cultivator tines 18. In addition to its upward and downward rocking movement, the elongate soil working member 47 continuously moves through the reniform path that is shown in broken lines in FIG. 3 of the drawings, the result of this movement being to bring said member repeatedly into crumbling and levelling contact with the soil surface. The precise shape of the reniform path of movement of the member 47 can be changed by connecting the leading ends of the control arms 40 to the lugs 42 at different horizontal levels. As has already been described, this can be brought about readily merely by moving the substantially horizontal pivot pins 41 into different pairs of the holes 43 that co-operate therewith. The level at which the elongate soil working member 47 will operate can also readily be adjusted, FIGS. 2 and 3 of the drawings showing said member 47 operating at its highest working level. It can be brought to a lower working level merely by withdrawing the pins 37 by which the arms 35 are pivotally connected to the supporting arms 36 and by re-establishing the pivotal connections with said pins 37 entered through alternative, and higher, pairs of the holes 38.

FIGS. 5 and 6 of the drawings illustrate an alternative form of soil cultivating implement in accordance with the invention which implement has a hollow box-shaped frame portion 55 that extends substantially horizontally transverse, and usually substantially horizontally perpendicular, to the intended direction of operative travel of the implement that is once again indicated by an arrrow A. The hollow frame portion 55 rotatably supports a row of substantially vertical, or at least upwardly extending, shafts 56, the axes of rotation of said shafts 56 being spaced apart from one another at regular intervals which conveniently have magnitudes of substantially 25 centimeters. There are twelve of the shafts 56 in the embodiment that is illustrated in FIGS. 5 and 6 of the drawings but, of course, this number is by no means mandatory and either more, or less, of the shafts 56 may be provided when desired. The shafts 56 are rotatably mounted in upper and lower walls of the hollow frame portion 55 and each shaft 56 is provided, at its lowermost end that projects from beneath the bottom of said frame portion 55, with a corresponding soil working or cultivating member 60. Each member 60 comprises a substantially horizontal support 57 having a central hub that is firmly, but releaseably, secured to the lowermost downwardly projecting end of the corresponding shaft 56, sleevelike tine holders 58 that are mounted at the opposite ends of the support 57 and rigid soil working tines 59 which have fastening portions that are releaseably secured in said holders 58 and soil working portions that project downwardly therefrom into the soil while the implement is in operation.

Each shaft 56 is provided, inside the hollow frame portion 55, with a corresponding straight-toothed or spur-toothed pinion 61, said pinions 61 being so dimensioned that the teeth of each of them are in mesh with those of its immediate neighbour, or both of its immediate neighbours, in the single row thereof. Thus, during operation, each pinion 61 and the corresponding soil working or cultivating member 60 will revolve in a direction which is opposite to the direction of rotation of the neighbouring pair of elements 60/61 or both of the neighbouring pairs of elements 60/61. One end of the center pair of the row of twelve shafts 56 has an upward extension through the top of the hollow frame portion 55 into a gear box 62 that is mounted on top of said frame portion. The shaft extension is in driven communication with a substantially horizontal rotary input shaft 64 of the gear box 62 by way of transmission members which it is not necessary to describe nor illustrate for the purposes of the present invention but which members include the parts of a change-speed gear 63 that is mounted at the back of the gear box 62 with respect to the direction A. The change-speed gear 63 includes pairs of interchangeable and/or exchangeable pinions that can be arranged to give any chosen one of a plurality of different transmission ratios between the input shaft 64 and the aforementioned upward extension of one of the shafts 56 by which all of the soil working or cultivating members 60 are rotated. Thus, said members 60 can be rotated at a speed appropriate to the nature and condition of the soil that is to be cultivated and to the purpose for which that soil is to be employed after cultivation without having to change the initiating speed of rotation that is applied to the splined end of the input shaft 64 that projects forwardly in substantially the direction A from the front of the gear box 62. This end of the input shaft 64 is, of course, intended to be placed in driven connection with the power take-off shaft of an agricultural tractor or other operating vehicle in the same manner as has already been mentioned in connection with the embodiment of FIGS. 1 to 4 of the drawings using the known telescopic transmission shaft, having universal joints at its opposite ends, that can be seen in FIGS. 1 and 2.

Rearwardly projecting lugs 65 are provided at the opposite sides or ends of the hollow frame portion 55 and support plates 67 are turnably connected to those lugs 65 by substantially horizontally aligned pivot pins 66 which define an axis that is substantially perpendicular to the direction A. The leading ends of the support plates 67 with respect to the direction A are interconnected by a support beam 68 which extends substantially horizontally perpendicular to the direction A immediately to the rear of the hollow frame portion 55. As seen in side elevation (FIG. 6), each of the support plates 67 has a somewhat irregular shape which is generally reniform, the broadest region (in a vertical direction) of each plate 67 being located towards the front thereof relative to the direction A. A plurality of elongate elements in the form of strips 70, 71 and 72 (totalling four in the embodiment of FIGS. 5 and 6 of the drawings) interconnect the two support plates 67 at substantially regularly spaced apart intervals, each strip 70, 71 and 72 being parallel to the support beam 68 and being arranged with its general plane substantially parallel to the general planes of the other strips with each such general plane in a substantially vertical, or at least upwardly extending, attitude. The strips 70, 71 and 72 are interconnected at regular intervals between the support plates 67, by a plurality (in this case three) of further support plates 69, said further support plates 69 being substantially parallel to one another and to the support plates 67 and all of them having substantially the same size and shape as the support plates 67 except that they do not include the forwardly convergent portions of the support plates 67 that are pivotally connected to the lugs 65 by way of the pivot pins 66. It can be seen from FIGS. 5 and 6 of the drawings that the support plates 67 and further support plates 69 decrease in vertical extent towards their rearmost ends and that the two rear strips 71 and 72 have narrower upright widths than do the two leading strips 70, the rearmost strip 72 being even narrower in upright width than is the strip 71. In this embodiment, the support plates 67, the further support plates 69 and the elongate strips 70, 71 and 72 together afford an elongate soil working member that is generally indicated by the reference 73. At least in the attitude of the elongate soil working member 73 that is illustrated in FIGS. 5 and 6, the general planes of the four strips 70, 71 and 72 are inclined to the vertical by a few degrees in such a way that the uppermost edges of those strips are more advanced with respect to the direction A than are the lowermost edges thereof.

One of the further support plates 69 that is located near to the center of the elongate soil working member 73 is provided with an upwardly directed arm 74 whose top is pivotally linked to the rearmost and lowermost end of a connecting rod 75. The opposite upper and leading end of said connecting rod 75 is pivotally connected to one arm of a rocker 76 that is turnable about a substantially horizontal axis afforded by a pivot pin carried by a pair of lugs that are welded or otherwise rigidly secured to the top of the gear box 62. A second arm of the rocker 76 is connected by a universal ball and socket joint 77 to a lug carried by a ring 78 which rotatably surrounds a disc-shaped eccentric (not visible in FIGS. 5 and 6) that is fastened to the rotary input shaft 64 of the gear box 62 immediately behind the splined foremost portion of that shaft 64.

Brackets at the front of the hollow frame portion 55, with respect to the direction A, carry a coupling member or trestle 79 that is of generally triangular configuration when viewed in front or rear elevation. Substantially the apex of the coupling member or trestle 79 is connected to horizontally spaced locations at the top and back of the hollow frame portion 55 by two tie beams 80 that extend in downwardly and rearwardly divergent relationship from said coupling member or trestle 79 to the back of the frame portion 55. In the use of the implement that has been described with reference to FIGS. 5 and 6 of the drawings, its coupling member or trestle 79 is connected to the tree-point lifting device or hitch of an agricultural tractor or other operating vehicle and the rotary input shaft 64 of its gear box 62 is placed in driven connection with the power take-off shaft of the same tractor or other operating vehicle by way of the known intermediate telescopic transmission shaft that has been referred to above. The change-speed gear 63 is adjusted to give a speed of rotation of the soil working or cultivating members 60 that is appropriate to the nature and condition of the soil and to the result that is required. The soil working portions of the tines 59 of successively neighbouring members 60 are spaced apart from one another by slightly greater distances than are the axes of rotation of those members 60 so that, during operation, the alternately contrarotating members 60 will work overlapping strips of soil down to a relatively great depth so that, in effect, the implement will work a single broad strip of land having a width, in the example that is being described, of substantially 3 meters. The elongate soil working member 73 that is located behind the soil working or cultivating members 68 with respect to the direction A works the same broad strip of soil as do those members 60, said member 73 rocking upwardly and downwardly, during operation, about an axis that is located in front of it relative to the direction A and that is defined by the substantially horizontally aligned pivot pins 66. The upward and downward rocking motion of the member 73 about the axis defined by the pivot pins 66 is caused by the motion of the ring 78 that rotatably surrounds the eccentric which is secured to the input shaft 64 of the gear box 62. This motion causes the rocker 76 to turn to and fro about its pivotal connection to the top of the gear box 62 and this movement is transmitted to the member 73 by the connecting rod 75. The upwardly and downwardly rocking elongate soil working member 73 repeatedly makes contact with the surface of the soil that has been worked by the foregoing tines 59 and this repeated contact, particularly the effect of the strips 70, 71 and 72, brings about a flattening and crumbling action upon the surface of the already worked soil.

Although various features of the soil cultivating implements that have been described and that are illustrated in the accompanying drawings will be set forth in the following claims as inventive features, it is emphasised that the invention is not necessarily limited to those features and that it includes within its scope each of the parts of each soil cultivating implement that has been described, and/or that is illustrated in the accompanying drawings, both individually and in various combinations.

What we claim is:

1. A soil tilling machine having a frame movable over the ground and soil working means supported by said frame, said soil working means comprising a forward row of tine means and an elongated soil tilling member positioned to the rear of said tine means, said row extending transverse to the direction of travel, said tilling member being pivoted to said frame and comprising a support having elongate elements that extend substantially horizontal and transverse to the direction of travel, said elements being spaced apart one behind the other with respect to the direction of machine travel, said tine means comprising a plurality of movable tines mounted on an elongated common frame portion that extends generally parallel to said tilling member, driving means connected to move said tines in the soil and said driving means linked to rock said tilling member about a substantially horizontal pivot axis during operation, said driving means comprising at least one eccentric that orbits about a substantially horizontal axis and arm means interconnecting the eccentric to said tilling member, said support together with the elements being pivoted upwardly and downwardly to contact, crumble and level the soil worked by said tine means.

2. A machine as claimed in claim 1, wherein said tilling member is linked to the frame and also to said driving means, said driving means connected to move the support and said elements through a compound renoform motion, including both substantially horizontal and vertical components.

3. A machine as claimed in claim 1, wherein said tine means comprises a plurality of tines mounted on a common support beam that extends generally parallel to said tilling member, said support beam being pivoted to said frame and said driving means being linked to rock the beam support together with tines in up and down directions.

4. A machine as claimed in claim 1, wherein said tilling member has at least one upwardly and forwardly extending supporting arm which is pivoted to said eccentric.

5. A machine as claimed in claim 4, wherein said supporting arm is pivotably connected to a corresponding control arm which is pivoted to said frame.

6. A machine as claimed in claim 4, wherein each supporting arm is formed with vertically spaced apart holes and a pin is entered through a chosen one of said holes to connect said supporting arm to said eccentric.

7. A machine as claimed in claim 4, wherein said supporting arm is also pivoted to said frame through a control arm, the pivot connections of the supporting arm with the eccentric and said frame, including a forward two pivots and a rear two pivots, the forward two pivots being separated by a distance that substantially differs from the distance between the rear two pivots.

8. A machine as claimed in claim 7, wherein said supporting arm is connected to the eccentric with a further arm that extends forwardly and above said control arm, said further arm being relatively shorter than said control arm.

9. A machine as claimed in claim 8, wherein said further arm is connectable to a number of different locations along the length of said supporting arm to change the working level of said tilling member.

10. A soil tilling machine having a frame movable over the ground and soil working means supported by said frame, said soil working means comprising an elongated soil tilling member positioned to the rear of a row of tines that extends transverse to the direction of travel, said tilling member comprising elongated elements that extend substantially horizontally transverse to the direction of travel of the implement, one positioned behind the other with respect to said direction, tines being mounted on a common support beam that extends generally parallel to said tilling member, said support beam being pivoted to said frame and driving means having at least one eccentric that is linked to said beam to rock the tines up and down, said tilling member being pivoted to the frame by arm means and being rockable back and forth about a substantially horizontal axis to contact the ground surface during operation, said tilling member being pivoted to said frame by at least one forwardly extending control arm of said arm means said arm means being linked to said eccentric, forward ends of said control arm being connectable to said frame at any chosen one of a plurality of different settings that cause the tilling member to be rocked through different paths by said eccentric.

11. A machine as claimed in claim 10, wherein the support beam and said tilling member are connected at two spaced apart locations to respective eccentrics of said driving means.

12. A machine as claimed in claim 10, wherein said driving means includes a shaft that extends transverse to the direction of travel, said shaft having opposite ends with corresponding eccentrics operatively connected to said support beam and said tilling member.

13. A soil tilling machine having a frame movable over the ground and soil working means supported by said frame, said soil working means comprising an elongated soil tilling member positioned to the rear of the tines, said tines being arranged in a row that extends transverse to the direction of travel, said tilling member being pivoted to said frame and comprising elongate elements that extend substantially horizontal and transverse to the direction of travel of the implement, said elements being positioned one behind the other with respect to said direction, said tines being mounted on a common support beam that extends generally parallel to said tilling member, said support beam being pivoted to said frame and driving means connected to rock the beam and move the tines through the soil, said driving means including a drive shaft with eccentrics connected to rock said tilling member about a substantially horizontal pivot axis during operation, said tilling member having upwardly extending supporting arm means and said eccentrics being connected to said arm means in any one of a plurality of different locations along the length of said arm means that vary the level at which the tilling member rocks relative to the ground.

* * * * *